United States Patent [19]

Aurentz

[11] Patent Number: 5,078,555
[45] Date of Patent: Jan. 7, 1992

[54] TOOLING TO FORM A COUNTERSINK OR COUNTERBORE

[75] Inventor: John A. Aurentz, Fallbrook, Calif.

[73] Assignee: Briles Rivet Corporation, Oceanside, Calif.

[21] Appl. No.: 533,002

[22] Filed: Jun. 4, 1990

Related U.S. Application Data

[63] Continuation-in-part of Ser. No. 312,229, Feb. 21, 1989, Pat. No. 4,917,550, which is a continuation of Ser. No. 239,708, Sep. 2, 1988, Pat. No. 4,895,482, which is a continuation of Ser. No. 5,101, Jan. 20, 1987, abandoned.

[51] Int. Cl.$^5$ .............................................. B23B 51/10
[52] U.S. Cl. ...................................... 408/231; 408/713
[58] Field of Search ............... 408/199, 200, 201, 233, 408/231, 713

[56] References Cited

U.S. PATENT DOCUMENTS

| | | |
|---|---|---|
| 289,522 | 12/1883 | Faught . |
| 676,669 | 6/1901 | Wack ................... 408/201 |
| 721,056 | 2/1903 | Löser .................... 408/233 |
| 897,041 | 8/1908 | Weller . |
| 918,365 | 4/1909 | Prentis . |
| 961,770 | 6/1910 | Grandperrin ............. 408/227 |
| 1,017,352 | 2/1912 | Wagner . |
| 1,131,871 | 3/1915 | Spoehr . |
| 1,232,980 | 7/1917 | Rossignol ............... 408/201 |
| 1,667,218 | 4/1928 | Purnis . |
| 2,469,543 | 5/1949 | Bondhus . |
| 2,811,054 | 10/1957 | Townsend . |
| 2,829,544 | 4/1958 | Bergstrom . |
| 2,937,545 | 5/1960 | Rauer et al. . |
| 3,712,753 | 1/1973 | Manzi . |
| 4,197,042 | 4/1980 | Krhounek et al. . |
| 4,609,315 | 9/1986 | Briles . |
| 4,895,482 | 1/1990 | Aurentz . |
| 4,917,550 | 4/1990 | Aurentz . |

FOREIGN PATENT DOCUMENTS

| | | | |
|---|---|---|---|
| 1233006 | 10/1960 | France | ................ 408/200 |
| 367750 | 8/1930 | United Kingdom . | |

*Primary Examiner*—Daniel W. Howell
*Attorney, Agent, or Firm*—William W. Haefliger

[57] ABSTRACT

Tooling to form a countersink or counterbore in a workpiece, the countersink or counterbore intersecting a bore hole in the workpiece, comprises a first part defining an axis to extend axially forwardly in the bore hole; a carrier body having a forward portion for piloting reception in the bore hole, and having a rearward portion adjustably carried by the first part; a cutter blade on the carrier, the blade projecting radially relative to the carrier body and forming at least one cutting edge shaped to form the countersink or counterbore; and a spacer on the carrier body and adjustably retained between the first part and the blade for holding the blade in predetermined axial position on and relative to the carrier body.

15 Claims, 5 Drawing Sheets

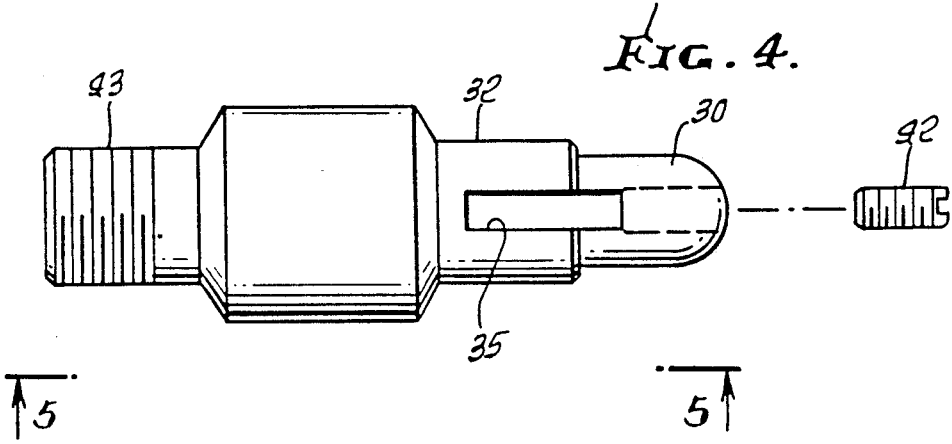
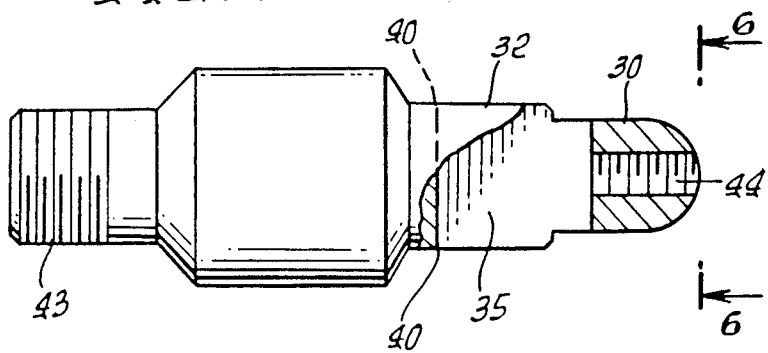
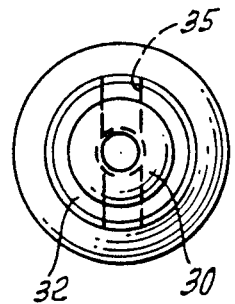
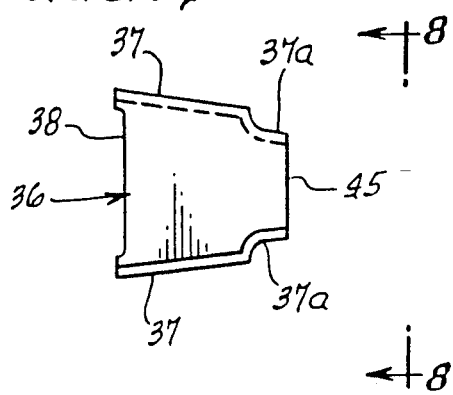
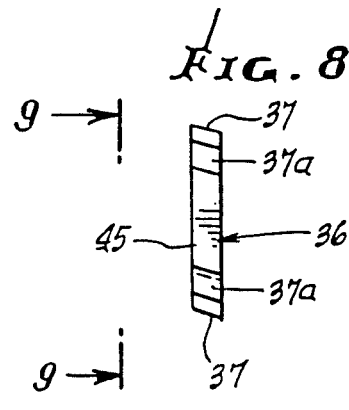

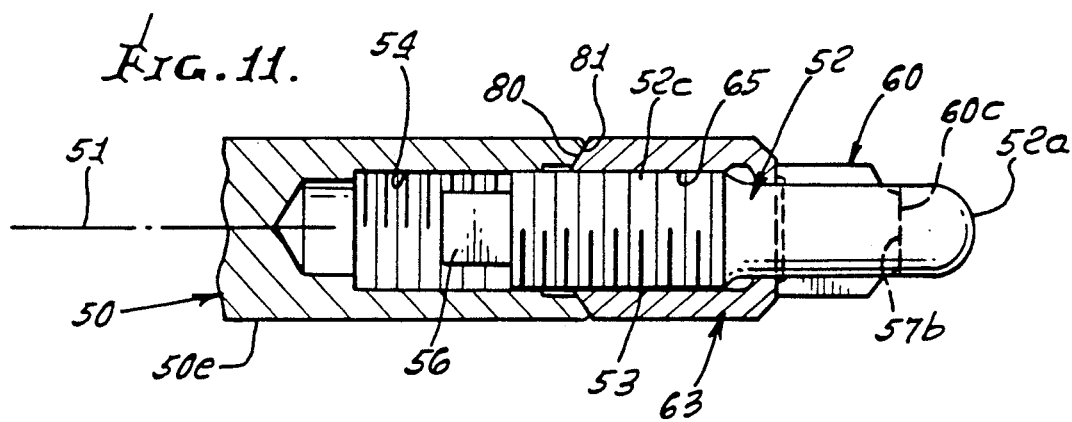
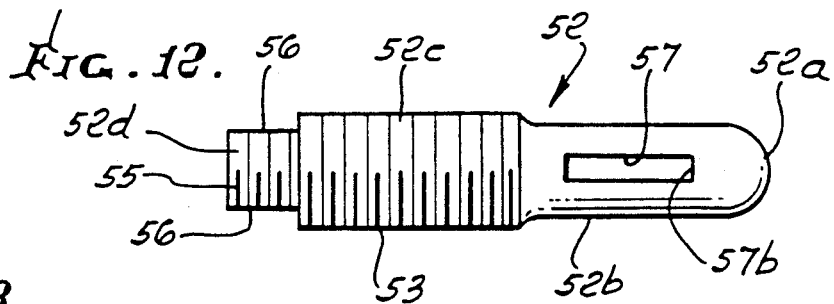
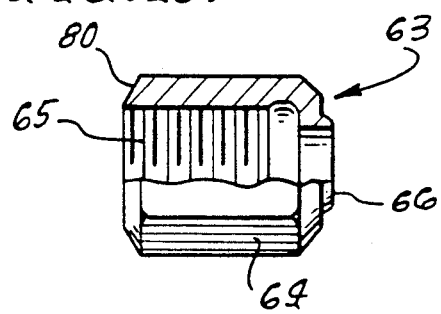
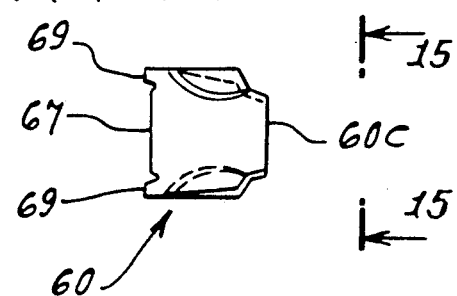
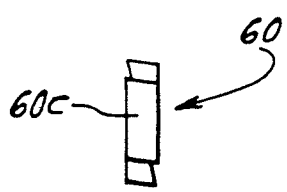

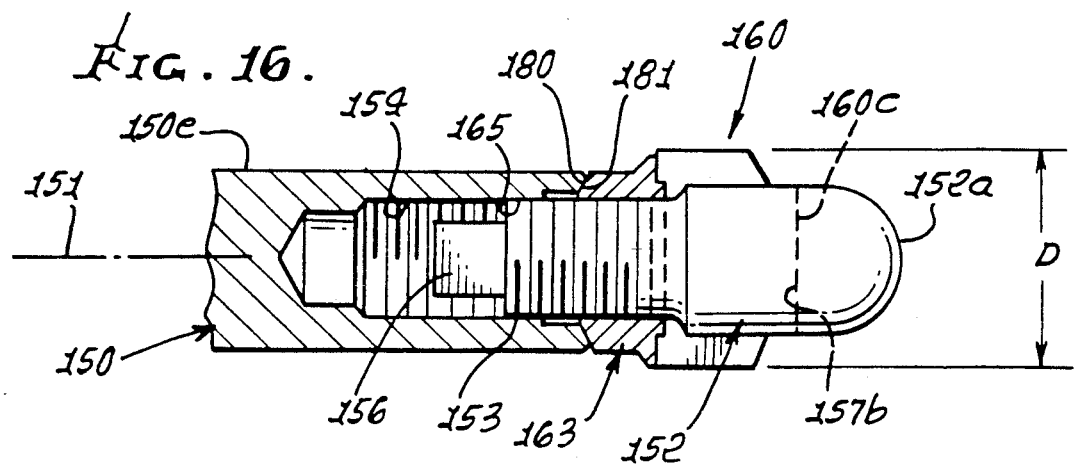
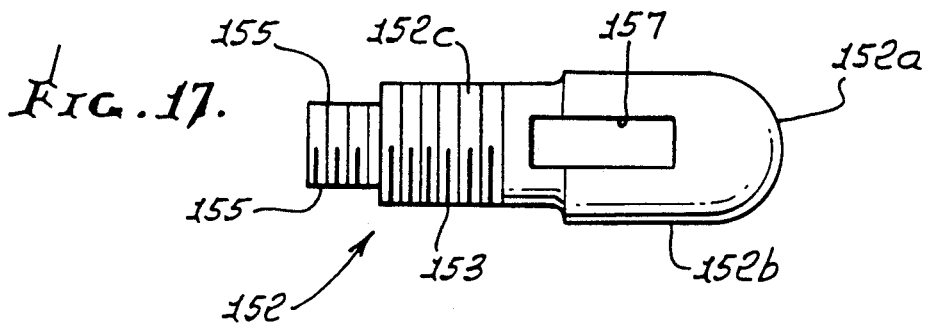
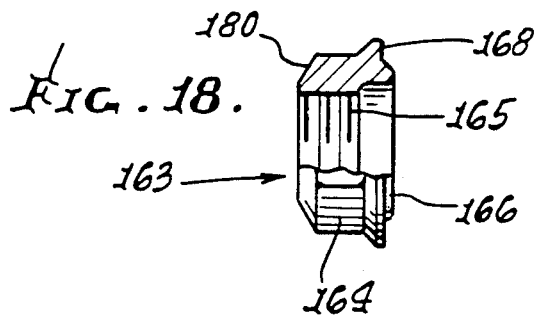
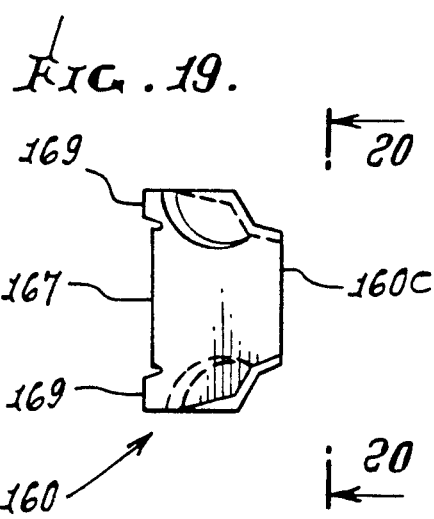
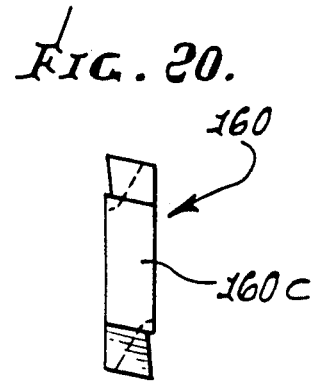

TOOLING TO FORM A COUNTERSINK OR COUNTERBORE

BACKGROUND OF THE INVENTION

This application is a continuation-in-part of Ser. No. 312,229 filed Feb. 21, 1989, which is a continuation of Ser. No. 239,708 filed Sept. 2, 1988 (now U.S. Pat. No. 4,895,482), which is a continuation of application Ser. No. 005,101 filed Jan. 20, 1987, now abandoned.

This invention relates to the formation of countersinks and counterbores in workpieces, and more particularly to highly advantageous devices for forming the countersinks and counterbores.

Countersinks are typically formed in workpieces at the ends of bore holes. There is need for tooling to rapidly and easily form such countersinks, in relation to the forming of the bore holes, as by using the same drive means, and employing replaceable blade inserts.

SUMMARY OF THE INVENTION

It is a major object of the invention to provide improved tooling meeting the above need. Basically, the tooling comprises:
a) a first part defining an axis to extend axially forwardly in the bore hole,
b) a carrier body having a forward portion for piloting reception in the bore hole, and having a rearward portion adjustably carried by the first part,
c) a cutter blade on the carrier, the blade projecting radially relative to the carrier body and forming at least one cutting edge shaped to form the countersink or counterbore, and
d) a spacer on the carrier body and adjustably retained between the first part and the blade for holding the blade in predetermined axial position on and relative to the carrier body.

As will appear, the first part and carrier body typically have telescopic interfit, and they may have threaded pin and box interconnection.

Further, the spacer and carrier body may have telescopic interfit, the spacer comprising a sleeve with a threaded bore to adjustably interfit the externally threaded rearward portion of the carrier body.

In addition, the blade typically has a rearward edge with centering engagement relative with the spacer, the carrier body defining a laterally extending through opening in which the blade is rearwardly received, laterally. In this regard, the carrier body preferably has a rearwardly facing positioning shoulder at the forward end of the through opening, and against which the blade is urged by the spacer for positioning the blade axially, relative to the carrier body, the spacer tightened against the blade at one of the rearwardly facing blade edges.

The blade typically forms two of such cutting edges, which extend radially outwardly at opposite sides of the axis; and those edges taper forwardly. The sleeve configuration spacer then has an outer diameter in excess of the overall lateral dimension of the blade, radially laterally.

As will further appear, the blade is easily removable from a slot and replaced. The invention provides for positive depth of counterbore control, which permits the insert to seat against the locating surface, thereby centrally aligning the cutting edges, and the lengths of the various diameters control the depth of counterbore cut, without adjustment. The blade can be exchanged when dull and resharpened if desired.

These and other objects and advantages of the invention, as well as the details of an illustrative embodiment, will be more fully understood from the following specification and drawings, in which:

DRAWING DESCRIPTION

FIG. 4 is a top view showing another form of the tooling with a piloted diameter and the rectangular blade location;

FIG. 5 is an enlarged side elevation on lines 5—5 of FIG. 4;

FIG. 6 is an end view taken on lines 6—6 of FIG. 5;

FIG. 7 is a side elevation of a cutter blade incorporated in the FIG. 4 tooling;

FIG. 8 is an end view o lines 8—8 of FIG. 7;

FIG. 11 is a section showing a piloted body, spacer lock nut and blade, assembled to a spindle;

FIG. 11a is an enlarged fragmentary section showing blade and spacer lock nut interfit;

FIG. 12 is a side elevation showing the piloted body of FIG. 11;

FIG. 13 is a side elevation showing the spacer lock nut of FIG. 11;

FIG. 14 is a side elevation showing the blade as used in FIG. 11;

FIG. 15 is an end view on lines 15—15 of FIG. 14;

FIG. 16 is a view like FIG. 11 showing a modified assembly of a piloted body, spacer lock nut, and blade, assembled to a spindle;

FIG. 17 is a side elevation showing the piloted body in FIG. 16;

FIG. 18 is side elevation showing the spacer lock nut of FIG. 16;

FIG. 19 is a side elevation showing the blade of FIG. 16; and

FIG. 20 is an end elevation taken on lines 20—20 of FIG. 19.

DETAILED DESCRIPTION

Figure 1:
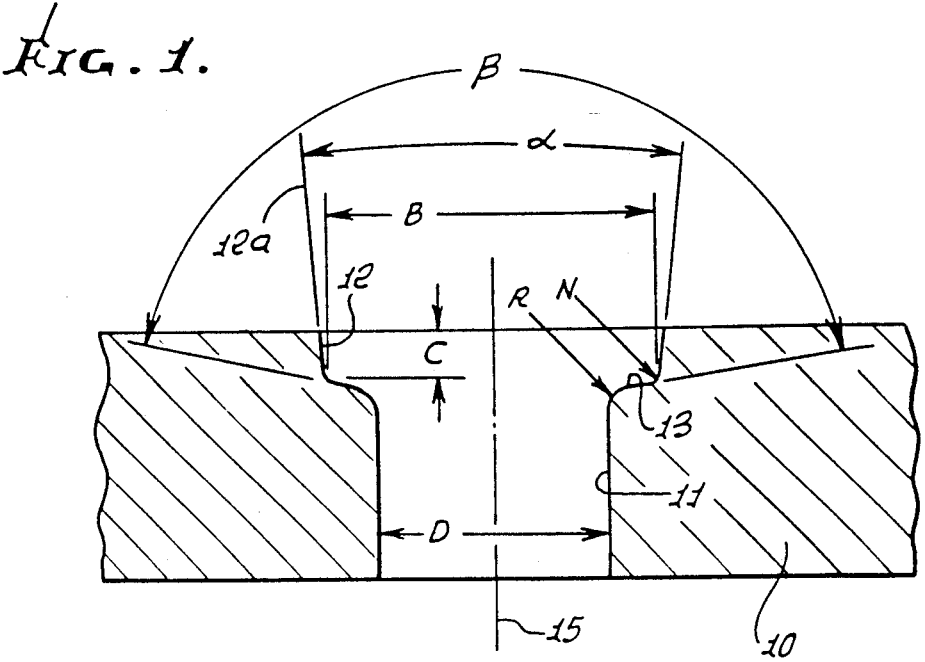
FIG. 1 is a section through a workpiece showing bore and countersink therein.

In FIG. 1, a workpiece 10, of metal or composite material, has a bore 11 and a countersink counterbore 12 formed therein. The bore 11 is typically cylindrical; and the counterbore is tapered as shown at 12a, i.e., flares endwise outwardly. The included angle $\alpha$ of the flare may for example be about 11°; and the included angle $\beta$ of step shoulder 13 may be about 160°. The latter flares are shown between a convex radius of R, and a concave radius at N. The diameter D, height C, and values R and N may vary, but the proportionality remains approximately the same.

Figure 2:
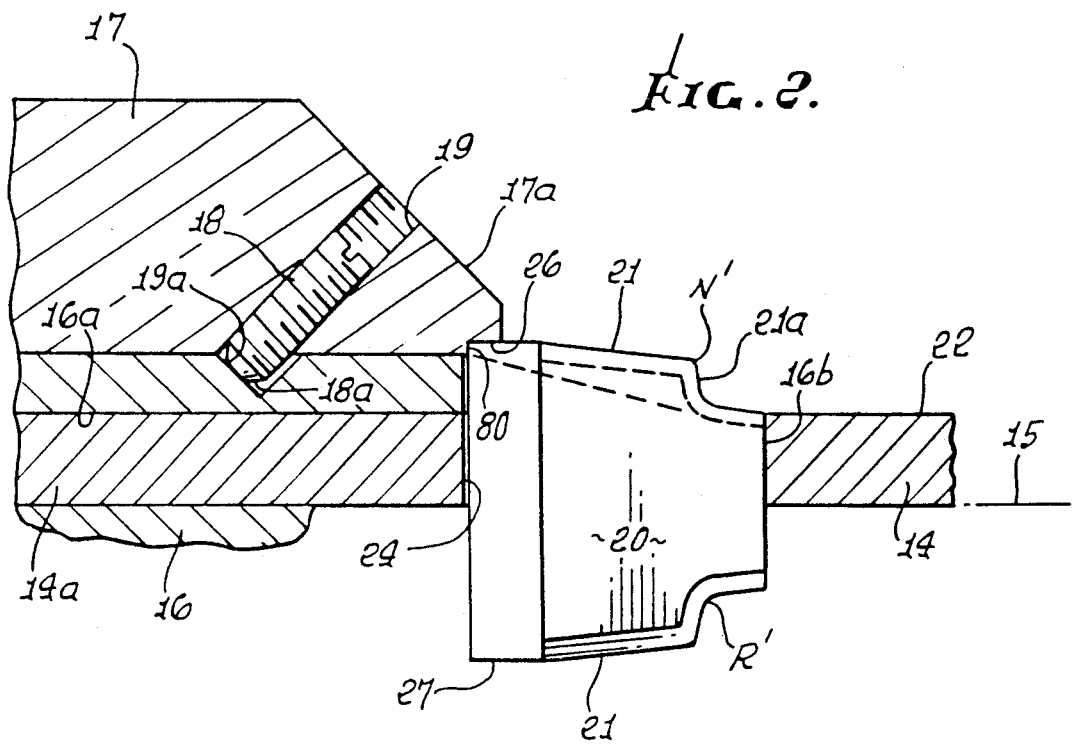
FIG. 2 is a section in elevation showing one form of the invention with the combined fluted drill.
Figure 3:
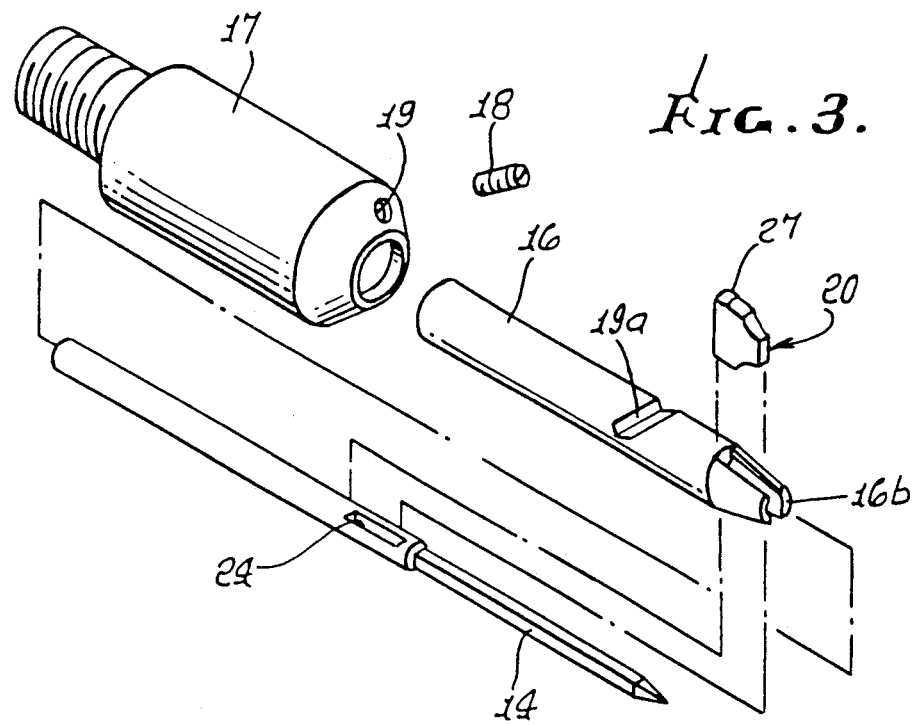
FIG. 3 is an exploded view showing the FIG. 2 assembly tooling.

It is an object of the invention to provide tooling to precisely form the annular countersink 12 and step shoulder 13 while employing a first part or element that extends forwardly in the bore hole 11 to pilot or center the cutting tool. As shown in the FIGS. 2-3 form of the invention, the first part or element comprises a fluted drill 14 employed to form the hole 11 as the drill is rotated and advanced in the direction of axis 15. A rotatable carrier for the drill comprises sleeve 16 having a bore 16a closely receiving the drill extent 14a, the sleeve terminating at end 16b. The carrier also includes a sleeve-like body 17 fitted over sleeve 16 and locked to the sleeve as by a set screw 18. Screw 18 is threaded into angled bore 19 in the body, and its end 18a fits in a locking recess 19a formed in the sleeve 16. Also, the drill end 14a is then clamped in the sleeve 16 by such means. A motor, not shown, rotates the drill.

Blade 20 may be considered as within or on the carrier, and it projects radially relative to the first part (i.e., drill). It extends in a radial axial plane, and it forms at least one cutting edge 21 spaced outwardly of a cylinder 22 defined by the surface of the drill. Cutting edge 21 is shaped to form the counterbore 12 as the blade is rotated. Actually, the blade typically has like cutting edges 21, as shown, which extend radially outwardly at opposite sides of axis 15. Edges 21 have extensions 21a which also extend inwardly as shown, so as to cut or form the countersink 13 a the blade rotates.

More specifically, the drill 14 has a rectangular slot 24 extending sidewardly through the drill to closely receive the blade. The blade has rearward outer edges that have centering engagement with locating surfaces defined by the carrier, and facing forwardly. In the example, the body 17 forwardly tapered extent 17a defines two notches or recesses 26 which closely receive the rearward outer corners 27 of the blade, to precisely locate the blade radially, i.e., centering it so that opposite cutting edges 21 for example are at the same distances from the axis 15. Also, endwise location of the blade is provided at 80. At the same time, torque is transmitted to the blade by the motor driven drill, as via the interior walls of the slot 24. Note the cutting edge radius N' corresponding to radius N, and the cutting edge radius R' corresponding to radius R. The blade is easily replaced, as by retracting the set screw 18, axially displacing the body 17 away from the blade, and removing the blade from the slot 24.

Figure 9:
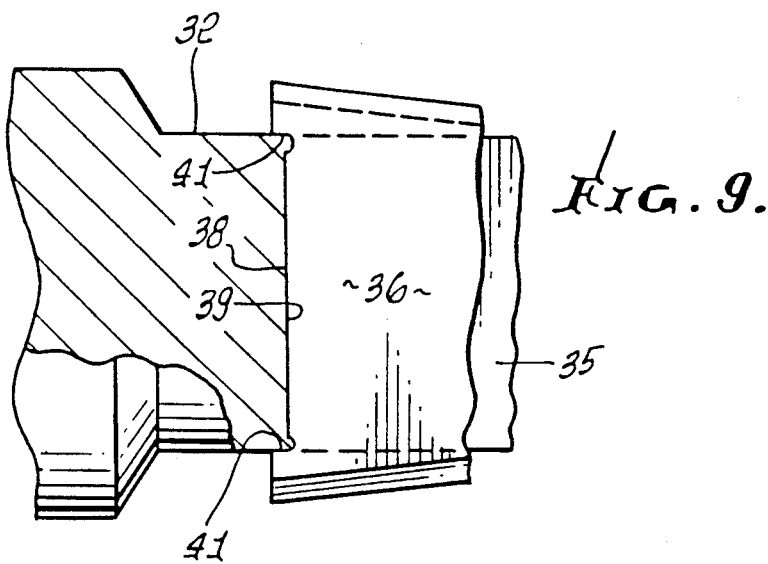
FIG. 9 is an enlarged fragmentary view on lines 9—9 of FIG. 8 detailing the centering engagement of the blade.
Figure 10:
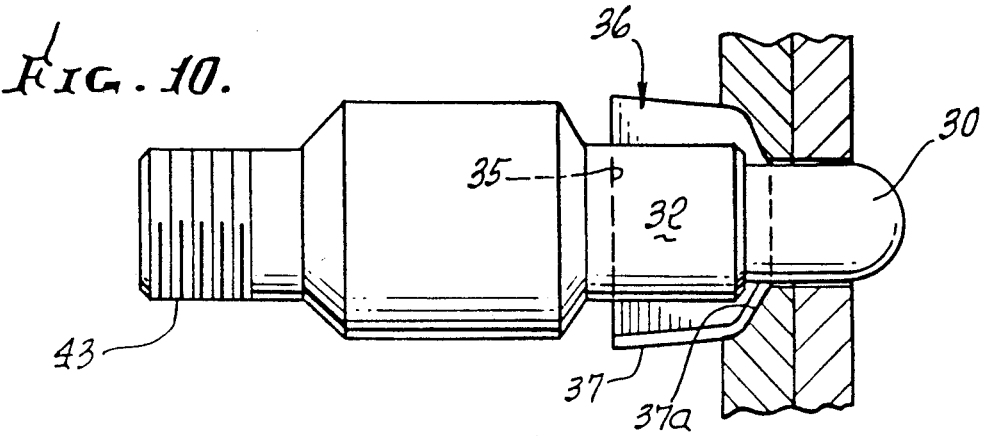
FIG. 10 is a view like FIG. 5 showing use of the tool.

In that form of the invention shown in FIGS. 4-9, the first part or element comprises a cylindrical shaped pilot 30, integral with a carrier body 32. A rectangular through slot 35 in the body 32 receives the blade 36, which has radially opposite cutting edges 37 and 37a corresponding to edges 21 and 21a, described above. The rear transverse edge 38 of the blade defines an axial locating surface that engages forward facing edge 39 of the body. Outer rear corners 40 of the body 32 interfit recesses 41 in the blade 36, as seen in FIG. 9, to radially center the blade. Body 32 is rotated as by a suitable motor, not shown, connected at 43 to the body. A set screw 42 is engaged with internal thread 44 in pilot 30 and tightened against the blade edge 45 to apply pressure and align the blade surface 38 against facing edge 3 of the body. When cutting a counterbore/countersink at one end of a bore hole while the pilot 30 is engaged, the forwardly tapered cutting and cut edges 37 and 37a exert equal cutting forces, thus maintaining central alignment concentric with the bore hole, as shown in FIG. 10. The blade can be made in various hard materials such as carbide, "high" molybdenum content hardened tool steel, ceramic and/or diamond tipped, or coated with diamond powder, or titanium nitride, or other hard coatings.

While the counterbore is shown as tapered at 12a, FIG. 1, it will be understood that it may be "straight sided", i.e., cylindrical parallel to axis 15.

In FIGS. 11-15, a first part is in the form of a spindle 50 and defines an axis 51 to extend forwardly in the workbore hole, as referred to above. A carrier body 52 has a forward portion which is dome shaped at 52a, and defines a cylindrical outer surface at 52b, for piloting in the bore hole. The carrier body has telescopic interfit with the spindle, and for that purpose the rearward portion or extent 52c g of the body 52 is externally threaded at 5 to threadably interfit an internal thread 54 defined by the spindle. The diameter of rearward extent 52a, as defined by the tips of threads at 53, exceeds the diameter of cylindrical surface 52b. A reduced diameter rearward portion 52d of the body 52 is threaded at 55, and has wrench flats at 56 for purposes as will appear.

A rectangular periphery slot 57 is cut in the body forward portion to sidewardly intersect cylindrical surface 52b, the slot being forwardly elongated, axially. A cutter blade 60 is closely received in the slot, and may be similar to blade 36 referred to above.

A spacer 63 is provided on the carrier body 52 and is adjustably retained between the first part, or spindle, 50, and the removable blade 60, for holding the blade in predetermined axial position on and relative to the carrier body. The spacer takes the form of a lock nut 63 in FIGS. 11 and 13, and has a hexagonal outer surface 64, which may have the same outer maximum hexagon as the outer diameter 50e of the spindle. The spacer has an internal thread at 65 to be made up (i.e., meshing) with the external thread 53 of the carrier body; and the spacer has a forward, annular flange or protrusion 66 that is receivable on make-up into a centering recess 67 formed at the rearward end of the blade, whereby flat end face 68 of the spacer, about 66, seats against flat end faces 69 of the blade, generally radially outwardly of recess 67. See also FIG. 11a. Thus, to assemble the spacer to the blade prior to reception of the carrier body in the spindle, the spacer and carrier body are relatively rotated to engage the faces 68 and 69, and tighten them together, the forward end 60c of the blade then tightening against the forward wall 57b of the slot 57. Wrenches may be applied to the flats 56 and to the hex 64 to aid in such tightening. Centering of the blade is achieved by the centering tongue and groove fit of the outer diameter surface 61b of the flange 66 with the outer surfaces 67b of recess 66. See FIG. 11a.

Thereafter, the carrier body threaded extent rearwardly of the spacer is made up onto the spindle thread, as shown in FIG. 11, until a taper 80 at the rear end of the spacer interfits a mating taper 81 at the forward end of the spindle, providing further locating or centering of the spacer. As is clear, the carrier body may be easily disassembled from the drill spindle, after which the spacer may be backed away from the blade to allow its removal and replacement, and subsequent reassembly to FIG. 11 condition.

In FIGS. 16-20, elements corresponding to those in FIGS. 11-15 bear the same numbers, but with a "1" before each number. In FIGS. 16-20, the diameter of rearward extent 152c, as defined by the tips of threads at 153, is less than the diameter of cylindrical surface 152b. Note also that the blade overall lateral dimension D exceeds the lateral overall dimensions of each of the spindle 150 and the carrier body 152.

I claim:

1. In tooling to form a countersink or counterbore in a workpiece, the countersink or counterbore intersecting a bore hole in the workpiece, the combination comprising
   a) a first part defining an axis to extend axially forwardly in the bore hole,
   b) a carrier body having a forward portion for piloting reception in the bore hole, and having a rearward portion adjustably carried by said first part,
   c) a cutter blade on the carrier, the blade projecting radially relative to said carrier body and forming at least one cutting edge shaped to form said countersink or counterbore, and
   d) a spacer on the carrier body and adjustably retained between the first part and the blade for holding the blade in predetermined axial and radial position on and relative to the carrier body,
   e) said carrier body having threaded interconnection with said first part and said spacer.

2. The combination of claim 1 wherein said first part and the carrier body have telescopic interfit.

3. The combination of claim 1 wherein said first part has a threaded bore, and said rearward portion of the carrier body is externally threaded to adjustably interfit said threaded bore.

4. The combination of claim 2 wherein said spacer and said carrier body also have coaxial telescopic interfit, the spacer comprising a sleeve.

5. The combination of claim 1 wherein said spacer and said carrier body have telescopic interfit.

6. The combination of claim 5 wherein said spacer has sleeve configuration, with an outer diameter in excess of the overall lateral dimension of the blade, radially laterally.

7. The combination of claim 5 wherein said spacer has forward end extent providing tongue and groove interfit with the blade.

8. The combination of claim 7 wherein said spacer has sleeve configuration rearwardly of said tongue and groove interfit, with an outer diameter less than the overall lateral dimension of the blade, radially laterally.

9. The combination of claim 1 wherein the blade has rearward edges with centering engagement relative with said spacer, the carrier body defining a laterally extending through opening in which the blade is rearwardly received, laterally.

10. The combination of claim 9 wherein said carrier body has a rearwardly facing positioning shoulder at the forward end of said through opening, and against which the blade is urged by the spacer for positioning the blade axially, relative to the carrier body, the spacer tightened against the blade at one of said rearward facing blade edges.

11. The combination of claim 1 wherein said blade forms two of said cutting edges, which extend radially outwardly at opposite sides of said axis.

12. The combination of claim 11 wherein said edges taper forwardly.

13. In tooling to form a countersink or counterbore in a workpiece, the countersink or counterbore intersecting a bore hole in the workpiece, the combination comprising
   a) a first part defining an axis to extend axially forwardly in the bore hole,
   b) a carrier body having a forward portion for piloting reception in the bore hole, and having a rearward portion adjustably carried by said first part,
   c) a cutter blade on the carrier, the blade projecting radially relative to said carrier body and forming at least one cutting edge shaped to form said countersink or counterbore, and
   d) a spacer on the carrier body and adjustably retained between the first part and the blade for holding the blade in predetermined axial position on and relative to the carrier body,
   e) said first part having a threaded bore, and said rearward portion to adjustably interfit said threaded bore,
   f) said spacer comprising a lock nut having a threaded bore to adjustably interfit said externally threaded rearward portion of the carrier body.

14. In tooling to form a countersink or counterbore in a workpiece, the countersink or counterbore intersecting a bore hole in the workpiece, the combination comprising
   a) a first part defining an axis to extend axially forwardly in the bore hole,
   b) a carrier body having a forward portion for piloting reception in the bore hole, and having a rearward portion adjustably carried by said first part,
   c) a cutter blade on the carrier, the blade projecting radially relative to said carrier body and forming at least one cutting edge shaped to form said countersink or counterbore, and
   d) a spacer on the carrier body and adjustably retained between the first part and the blade for holding the blade in predetermined axial position on and relative to the carrier body,
   e) said spacer and said carrier body having telescopic interfit,
   f) the spacer comprising a sleeve having axially tapered interfit with the forward end of said first part.

15. In tooling to form a countersink or counterbore in a workpiece, the countersink or counterbore intersecting a bore hole in the workpiece, the combination comprising
   a) a first part defining an axis to extend axially forwardly in the bore hole,
   b) a carrier body having a forward portion for piloting reception in the bore hole, and having a rearward portion adjustably carried by said first part,
   c) a cutter blade on the carrier, the blade projecting radially relative to said carrier body and forming at least one cutting edge shaped to form said countersink or counterbore, and
   d) a spacer on the carrier body and adjustably retained between the first part and the blade for holding the blade in predetermined axial postion on and relative to the carrier body,
   e) the spacer and said body each having wrench flats thereon, the wrench flats on the body projecting in said first part, and the wrench flats on the spacer outwardly exposed.

* * * * *